United States Patent [19]

Bowditch

[11] 4,273,598

[45] Jun. 16, 1981

[54] METHODS OF MAKING ADHESIVE BONDS

[75] Inventor: Malcolm R. Bowditch, Broadstone, England

[73] Assignee: The Secretary of State in Her Britannic Majesty's Government of the United Kingdom of Great Britain and Northern Ireland, London, England

[21] Appl. No.: 40,106

[22] Filed: May 18, 1979

[30] Foreign Application Priority Data

Jan. 20, 1977 [GB] United Kingdom ................. 2419/77

[51] Int. Cl.³ .................... E04B 2/00; B29H 19/00; B29C 17/00; B22P 19/10; B29C 27/22
[52] U.S. Cl. ........................................ 156/94; 156/71; 156/285; 156/198; 29/402.09; 114/227; 264/36; 428/63; 156/307.3
[58] Field of Search ................... 156/309, 94, 98, 313, 156/71, 285; 29/402.01, 402.09, 402.11, 402.13, 402.18; 264/36, 321; 114/227, 228, 229; 428/63, 34, 38, 311; 427/207 A

[56] References Cited

U.S. PATENT DOCUMENTS

| 3,193,438 | 7/1965 | Schafer | 156/313 |
| 3,847,722 | 11/1974 | Kistner | 156/94 |
| 3,930,919 | 1/1976 | Chant et al. | 428/311 |

FOREIGN PATENT DOCUMENTS 1266097 3/1972 United Kingdom.

OTHER PUBLICATIONS

Handbook of Epoxy Resins ©1967, Lee et al., pp. 10-4 to 10-11 and pp. 15-12 to 15-15, McGraw-Hill, N.Y.

Primary Examiner—John T. Goolkasian
Assistant Examiner—L. Falasco
Attorney, Agent, or Firm—Stevens, Davis, Miller & Mosher

[57] ABSTRACT

A method of making an adhesive bond, particularly suitable for underwater repairs consists of impregnating compliant foam material having an open cell structure with a thermosetting resinous adhesive, applying the foam to a substrate to be bonded or a puncture therein and applying pressure to the foam to immobilize the adhesive within the foam.

8 Claims, 5 Drawing Figures

METHODS OF MAKING ADHESIVE BONDS

This invention relates to methods of making adhesive bonds particularly, but not exclusively, to equipments or apparatus subjected to internal or external pressure and including for example the making of adhesive bonds in underwater engineering situation.

One of the problems associated with the repair of damaged equipments is that the adhesive used may be displaced by the force of the pressure before it can produce a satisfactory bond. Thermosetting resin adhesive can be admixed with a particulate or fibrous filler prior to use to increase the viscosity of the adhesive and hence to reduce its tendency to be displaced. Such an admixture, however, makes the adhesive more difficult to mix thoroughly and less capable of bonding with the equipment. Repairs to certain types of equipments such as pipes can be made by means of an adhesive-impregnated bandage but this technique is not generally applicable.

The present invention provides a method of making an adhesive bond in which the adhesive is imobilised in a novel way which permits the use of an easily mixed and readily wetting adhesive and which is particularly applicable to the repair of internally or externally pressurised equipments.

Accordingly the invention comprises a method of making an adhesive bond to a substrate, the method comprising impregnating a compliant synthetic foam carrier material having an open celled structure, with a thermosetting resinous adhesive, and applying the impregnated carrier material to the substrate in such a way that the carrier material is compressed to immobilise the adhesive within the interstices of its open celled structure. As the open celled carrier material is compressed the sizes of its interticial passages are reduced thus reducing the mobility of the adhesive within them. By suitably matching the adhesive viscosity and curing rate to the porosity of the carrier, a cured bond may be achieved without substantial displacement of the adhesive under the applied pressure.

Adhesive bonds made by the use of the foam impregnated carrier material may be utilised in the plugging of punctured substrates, the method comprising applying the impregnated carrier material to the substrate around the puncture and forcing the impregnated carrier material into the puncture.

Further, adhesive bonds made by the use of the foam impregnated carrier material may be utilised to attach an overlying layer, eg a patch or structural attachment, to the substrate, the method comprising applying the resin-impregnated foam carrier material to either the substrate or the overlying layer and pressing the two together to compress the carrier material therebetween. This method is useful in the in situ repair of damaged hulls, underwater structures or pressure vessels because the compression of the resin-impregnated foam by the hydrostatic or internal pressure traps the resin within the foam and helps to reduce the tendency of that same pressure to displace the adhesive. This method has however more widespread application because of the ease with which large quantities of resin can be handled for bonds over large surface areas and/or when thick resin layers are required. A further advantage is that bonds can be made using the method of the invention with comparatively little entrapment of air which entrapment, especially when at the resin interface, may greatly reduce the bond strength.

The invention finds principal application in the making of underwater bonds to ships' hulls, pipelines, drilling platforms etc. For these applications the open celled carrier material is impregnated with an adhesive capable of displacing, absorbing, or otherwise eliminating the bulk water from the substrate to which a bond is to be made, the adhesive being subsequently curable to form a strong bond therewith. Preferably this adhesive comprises a two part mix, the first part including a diglycidyl ether of bisphenol 'A' and the second part including a hardener based on either a cycloaliphatic polyamine or a 4,4' diaminodiphenylmethane (DDM). It has been found that these adhesives readily wet a surface to which they are physically applied despite the presence of water, but a non-ionic surface active agent may be incorporated into the adhesive to modify it such that it preferentially wets the substrate. An epoxide functional silane may also be included to chemically stabilise the adhesive/substrate interface bond.

Preferably the open celled carrier material comprises a reticulate polyester based polyurethane foam having a porosity of between 30 and 45 pores per inch (ppi). This material is readily available in a variety of porosities and possesses the necessary compliance and inertness to the adhesive formulation.

Whilst the substrate should preferably be cleaned and dressed before the bond is made in order to achieve the maximum bond strength, the method of the invention can produce acceptable bonds with uneven or encrusted surfaces. Further, the use of comparatively large thicknesses of adhesive in one layer is possible because of the support provided by the carrier material.

Another aspect of the invention provides a repair kit for use in the method described above, the kit comprising a thermosetting resinous adhesive and a compliant, open celled, synthetic foam carrier material. Preferably the adhesive is provided in two parts for admixture prior to use, the first part including a diglycidyl ether of bisphenol 'A' and the second part including either a cycloaliphatic polyamine based hardener or 4,4' diaminodiphenylmethane hardener. Preferably the open celled carrier material comprises a reticulate polyester based polyurethane foam having a porosity of between 30 and 45 ppi.

The repair kit may be supplied as a single pack within a plastics bag having separate compartments for each of the constituents; whereby for use the division between the adhesive compartments may be ruptured or otherwise removed in order that the components may be mixed.

The bonding method of the invention and the repair kit can be used on a wide variety of substrates including glass reinforced plastics (GRP), steels and concrete. It may be necessary to vary the adhesive formulation for particular applications.

The method of the invention will now be illustrated by means of the following examples and with reference to the accompanying drawings, in which.

Figure 1A:
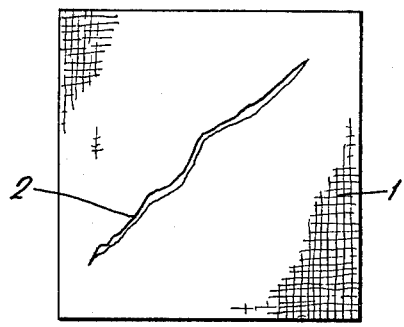
FIGS. 1A, 1B and 1C illustrate a plug repair to a glass reinforced plastics substrate.
Figure 1B:
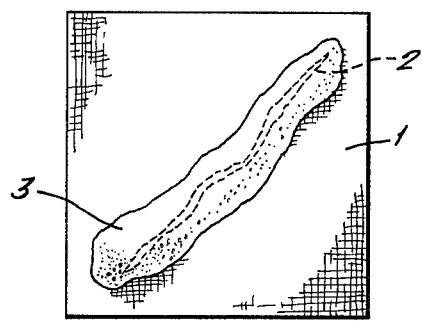
Figure 1C:
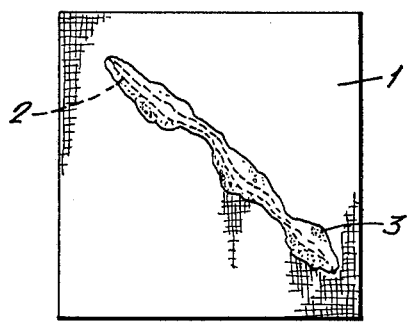

Referring firstly to the plug repair illustrated in FIGS. 1A, 1B and 1C, the substrate is a sheet 1 of glass reinforced plastics (GRP) having an elongate crack 2. The crack 2 is thought to be typical of the type of damage which is likely to be sustained by GRP hulled vessels. To provide a lifelike environment in the laboratory, the damaged sheet 1 was incorporated as one wall of a sheet steel box which was to be immersed in water. A rubber vent tube leading to the atmosphere was attached to the box and the box was lowered into a water tank.

The repair was carried out under water by means of the hands only using a two part resin system detailed below and designated Type I formulation UW43.

TYPE I RESIN FORMULATION UW43

| Constituent | Function or Description | Parts by Weight |
|---|---|---|
| Part A | | |
| Shell Epikote 828 | Resin-diglycidyl ether of bisphenol 'A' (epoxide equivalent Ca 185) | 100 |
| Union Carbide A187 | Epoxide functional silane | 2.0 |
| Ciba-Geigy White | Colour paste | 0.5 |
| Aerosil 200 | Filler - to impart thixotropic qualities to the adhesive and/or to adjust mix proportions | 8.0 |
| Part B | | |
| Ancamine MCA | A cycloaliphatic polyamine hardener | 55 |
| Epophen ED-1-Z | A polysulphide plasticiser hardener | 50 |
| Ciba-Geigy Black | Colour paste | 0.2 |
| Aerosil 200 | Filler - to impart thixotropic qualities to the adhesive and/or to adjust the mix proportions | 13 |

Equal portions (by weight) of both parts of the resin formulation designated UW43 were taken and mixed thoroughly. A suitably sized pad of open cell, low density, flexible polyurethane foam was then saturated with the freshly mixed resin, taken underwater, and placed over the crack 2 through which water had previously been passing. The impregnated foam pad was then worked by hand to force it into and to completely fill the crack 2. When the pad had been completely worked into place the exterior and interior sides of the panel 1 had the appearance shown in FIGS. 1B and 1C respectively. It can be seen that the pad 3 has completely covered the exterior surface of the sheet 1 in the region of the crack and in fact has largely penetrated the crack 2 to the interior surface of the sheet. The steel box, with the resin still uncured was lowered to the bottom of a 3 m deep tank of water so that it was subjected to the highest hydrostatic pressure experienced by current GRP hulls. When the box was recovered after a period of 24 hours immersion at that depth, its interior was found to be substantially free of water indicating the success of the repair.

To indicate the strength of the GRP/resin bond, foam pads impregnated with the adhesive formulation given above have been used to join in overlap water saturated sheets of GRP. Subsequent tests of GRP sheets joined underwater in this manner have shown the tensile strength of the repair to be ca 7.0 $MNm^{-2}$ with failure occurring cohesively within the GRP. Epoxy based adhesives are preferred for underwater jointing applications because of the ease in which they can be cold cured, their good adhesion and their general convenience. An alternative epoxy based adhesive for use underwater is designated Type I formulation UW31. This formulation is similar to that given for UW43 except that in part A 4.0 parts by weight of Sylodex 24 replaces the Aerosil 200 as filler and 2.0 parts by weight of Colorol Aquasorb is incorporated as a nonionic surface active agent, and except that in part B 5.0 parts by weight of Sylodex 24 replaces the Aerosil 200 as filler.

Another resin system suitable for underwater use is that designated Type II formulation UW27 and detailed below.

TYPE II RESIN FORMULATION UW27

| | Constituent | Function or Description | Parts by Weight |
|---|---|---|---|
| Part A | Araldite GY250 | Resin-diglycidyl ether of bishenol 'A' | 100 |
| | Union Carbide A187 | Epoxy functional silane | 15 |
| | Barytes | Fillers - to impart thixotropic qualities and/or to adjust mix proportions | 75 |
| | Sylodex 24 | | 3.0 |
| Part B | Araldite HY850 | Hardener - liquidisable form of diaminediphenylmethane | 64 |
| | Orgol tar | Plasticiser/flexibiliser | 40 |
| | Barytes | Fillers- to impart thixotropic qualities and/or to adjust mix proportions | 86 |
| | Sylodex 24 | | 2.0 |

The UW43 formulation has been used to provide satisfactory underwater bonds to GRP when used with the open cell foam as described. Whilst it is not presently intended that such a method should be used to make permanent repairs, bonds have been so made that have withstood total immersion for one year at room temperature without sign of degradation.

Figure 2:
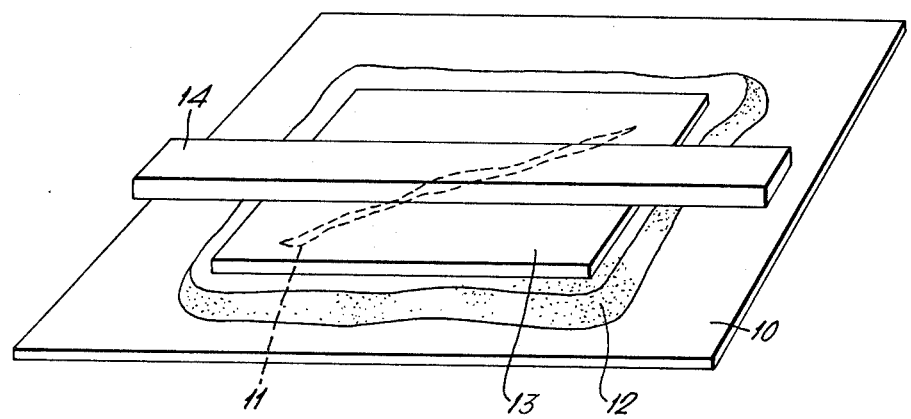
FIG. 2 illustrates a patch repair.

Referring now to FIG. 2, a new, slightly oily mild steel plate 10 having a split 11 therein was fitted to a water pressure tank as one side thereof. A water pressure of 131 $KNm^{-2}$ was applied to the interior of the tank giving a substantial spray of water from the split 11. A pad 12 of flexible open celled polyurethane foam measuring 250 mm × 160 mm × 25 m was then impregnated with a freshly prepared mix of the resin designated Type I formulation UW43. The impregnated pad was backed by a mild steel sheet 13 of the same area as the pad 12 and the two were applied over the split 11. The impregnated foam pad 12 was then compressed to a thickness of approximately 3 mm between the sheet 13 and the damaged sheet 10 by means of "G" cramps (not shown) and a wooden strongback 14. When the leaked stopped, the pressure on the strongback 14 was released and the internal pressure applied to the split 11 was increased to 200 $KNm^{-2}$ with no sign of leakage from the repair although the patching sheet 13 bowed under the applied pressure.

Figure 3:
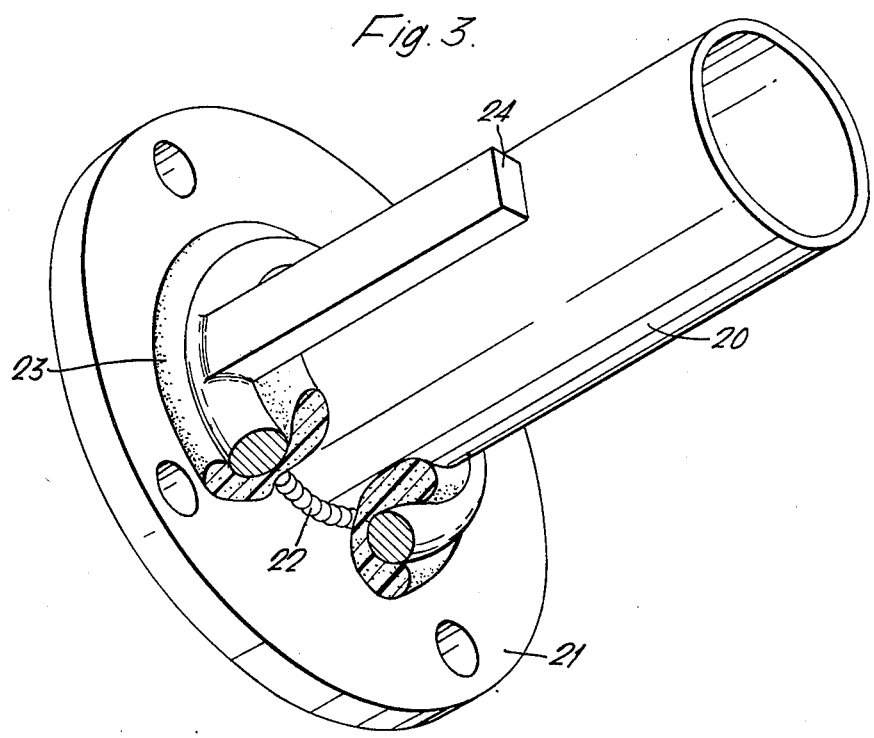
FIG. 3 illustrates a repair to a pipe flange weld.

In the repair illustrated in FIG. 3, a 50 mm internal diameter steel pipe 20 having a flange 21 welded thereon was taken and a 1 mm diameter hole was drilled through the weld 22. The pipe 20 was filled with water before a repair was made using the following procedure. An open cell flexible polyurethane foam pad 23 measuring 75 mm × 25 mm × 25 mm was impregnated with a small amount of freshly mixed resin to the fomulation UW43. The impregnated pad was then wrapped around the weld 22 and compressed thereon by an annular tool 24 held in place by a "G" cramp (not shown).

After removing the tool 24 the internal pressure was raised to 267 $KNm^{-2}$ with no evidence of leakage. After a period of 4 hours the pressure was increased to 534 $KNm^{-2}$ which was maintained over a weekend.

Subsequently the pressure was raised to 4.14 MNm$^{-2}$ without sign of leakage.

Whilst for most applications a jointing kit comprising the resin parts and the open celled foam as separate items is satisfactory, it may in some circumstances be advantageous to provide the three items in a single tripack container. For example the kit may be enclosed within a single plastics envelope having divisions or clips to form three separate compartments within the envelope. The resin parts can then be admixed by removing the dividing clip, or breaching the division, and working the envelope. Subsequently the open celled foam can be impregnated by removing the remaining clip or breaching the final division. This type of enclosure is particularly suitable for underwater use.

It will be apparent to those of ordinary skill in the art, that many variations in the methods and kits of the invention described are possible within the scope of the invention. The method can for example be used with many other substrates including concrete, although the adhesive formulation may need to be varied. Throughout the experiments described a reticulate polyurethane foam having a porosity of between 30 and 45 ppi has been used. Whilst the foam should be compliant, open celled and non-reactive with the adhesive, its composition and porosity are not critical. In particular the porosity may be selected to suit the viscosity and curing rate of the adhesive chosen for any application.

As mentioned previously, the method of the invention is very suitable for use in many applications requiring thick resin layers or large areas of coverage, because of the ease in which the resin-impregnated foam carrier may be applied. It also has the advantage of minimal air entrapment.

Further although the invention is not restricted in application to use for repair purposes or to use under or in the presence of water it may with advantage be used, for example, to provide repair or reinforcements to existing underwater structures such as offshore platforms, or as a general bonding method.

Typical examples of use of the invention in offshore repair situations are described in applicants co-pending UK Applications Nos. 50596/77, 53626/77, 21703/78 and 24367/78.

What I claim is:

1. A method of making an adhesive bond to a substrate in the presence of water, the method comprising the steps of impregnating a compliant synthetic foam carrier material having an open-celled structure with a thermosetting resinous adhesive, applying the impregnated carrier material to the substrate, compressing the impregnated carrier material against the substrate whereby initially the resinous adhesive causes bulk water to be displaced, absorbed or otherwise eliminated from the substrate to which the bond is to be made and the resinous adhesive is thereafter immobilized within the interstices of the carrier material and cures to form a strong bond with the substrate.

2. In the repair with an adhesive of a damaged substrate which will be exposed to water before the adhesive cures into a composition which resists its displacement by applied pressure, the process which comprises assembling with the substrate which is to be repaired an open cell flexible synthetic resinous foam impregnated with an uncured liquid thermosetting adhesive composition, pressing the foam against the substrate where it is to be repaired to expell initially less than all of the said liquid adhesive composition from the cells and to constrict the cells to entrap the composition remaining therein as the viscosity thereof increases during the curing process, and effecting an adhesive bond on the substrate.

3. The process of claim 2 wherein an imperfection in the substrate is repaired while the substrate is submerged in water, the impregnated foam is placed over the imperfection with one of its surfaces against the substrate bordering the imperfection, a patch is pressed against the foam on its opposite surface under an applied weight until the adhesive composition cures and the patch is bonded to the substrate and covers the imperfection.

4. A method as claimed in claim 1 in which the resinous adhesive comprises a two part mix, the first part including a diglycidyl ether of bisphenol 'A' and the second part includes a substance selected from cycloaliphatic polyamine and 4,4' diaminodiphenylmethane.

5. A method as claimed in claim 4 in which the resinous adhesive includes an epoxide functional silane.

6. A method as claimed in claim 5 in which the carrier material is a reticulate polyester-based polyurethane foam having a porosity of between 30 and 45 pores per inch.

7. A method as claimed in claim 1 in which the carrier material is a reticulate polyester-based polyurethane foam having a porosity of between 30 and 45 pores per inch.

8. A method as claimed in claim 4 in which the carrier material is a reticulate polyester-based polyurethane foam having a porosity of between 30 and 45 pores per inch.

* * * * *